US011106613B2

(12) United States Patent
Lantz et al.

(10) Patent No.: US 11,106,613 B2
(45) Date of Patent: Aug. 31, 2021

(54) HIGHLY SCALABLE ACCELERATOR

(71) Applicant: Intel Corporation, Santa Clara, CA (US)

(72) Inventors: Philip R. Lantz, Cornelius, OR (US); Sanjay Kumar, Hillsboro, OR (US); Rajesh M. Sankaran, Portland, OR (US); Saurabh Gayen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/940,128

(22) Filed: Mar. 29, 2018

(65) Prior Publication Data

US 2019/0303324 A1    Oct. 3, 2019

(51) Int. Cl.
   *G06F 13/364* (2006.01)
   *G06F 13/24* (2006.01)
   *G06F 9/50* (2006.01)

(52) U.S. Cl.
   CPC .......... *G06F 13/364* (2013.01); *G06F 9/5027* (2013.01); *G06F 13/24* (2013.01)

(58) Field of Classification Search
   CPC ....... G06F 13/24; G06F 13/364; G06F 9/5027
   See application file for complete search history.

(56) References Cited

U.S. PATENT DOCUMENTS

| | | | | |
|---|---|---|---|---|
| 2011/0149737 | A1* | 6/2011 | Muthiah | G06F 9/5011 370/235 |
| 2014/0136680 | A1* | 5/2014 | Joshi | H04L 43/026 709/224 |
| 2014/0359182 | A1* | 12/2014 | Georgiev | G06F 9/52 710/241 |
| 2018/0088978 | A1* | 3/2018 | Li | G06F 9/45558 |
| 2018/0095750 | A1* | 4/2018 | Drysdale | G06F 9/5038 |
| 2018/0189104 | A1* | 7/2018 | Agarwal | G06F 9/505 |
| 2019/0075183 | A1* | 3/2019 | Silberkasten | H04L 67/141 |

FOREIGN PATENT DOCUMENTS

WO    2017112233 A1    6/2017

OTHER PUBLICATIONS

Extended European Search Report for Application No. 19160074.1, dated Jul. 23, 2019, 10 pages.
Paolino M., et al., "FPGA Virtualization with Accelerators Overcommitment for Network Function Virtualization," International Conference on Reconfigurable Computing and FPGAS, IEEE, Dec. 4, 2017, XP33313032, 6 pages.

* cited by examiner

*Primary Examiner* — Nimesh G Patel
(74) *Attorney, Agent, or Firm* — Nicholson De Vos Webster & Elliott LLP

(57) ABSTRACT

Embodiments of apparatuses, methods, and systems for highly scalable accelerators are described. In an embodiment, an apparatus includes an interface to receive a plurality of work requests from a plurality of clients and a plurality of engines to perform the plurality of work requests. The work requests are to be dispatched to the plurality of engines from a plurality of work queues. The work queues are to store a work descriptor per work request. Each work descriptor is to include all information needed to perform a corresponding work request.

18 Claims, 9 Drawing Sheets

HIGHLY SCALABLE ACCELERATOR

FIELD OF INVENTION

The field of invention relates generally to computer architecture, and, more specifically, but without limitation, to accelerators in computer systems.

BACKGROUND

In addition to one or more general-purpose processors, computers and other information processing systems may include application-specific processors, such as network processors, graphics processors, data-analytics accelerators, etc. Any such non-general-purpose processors or accelerators may be referred to generically as a device and may be accessed or used by software applications or entities which may be referred to generically as clients. A device may be shared, during a given period or otherwise, by multiple clients according to various techniques, such as virtualization. The number of clients that a device can support according to a shared approach may be referred to as the scalability of the device.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
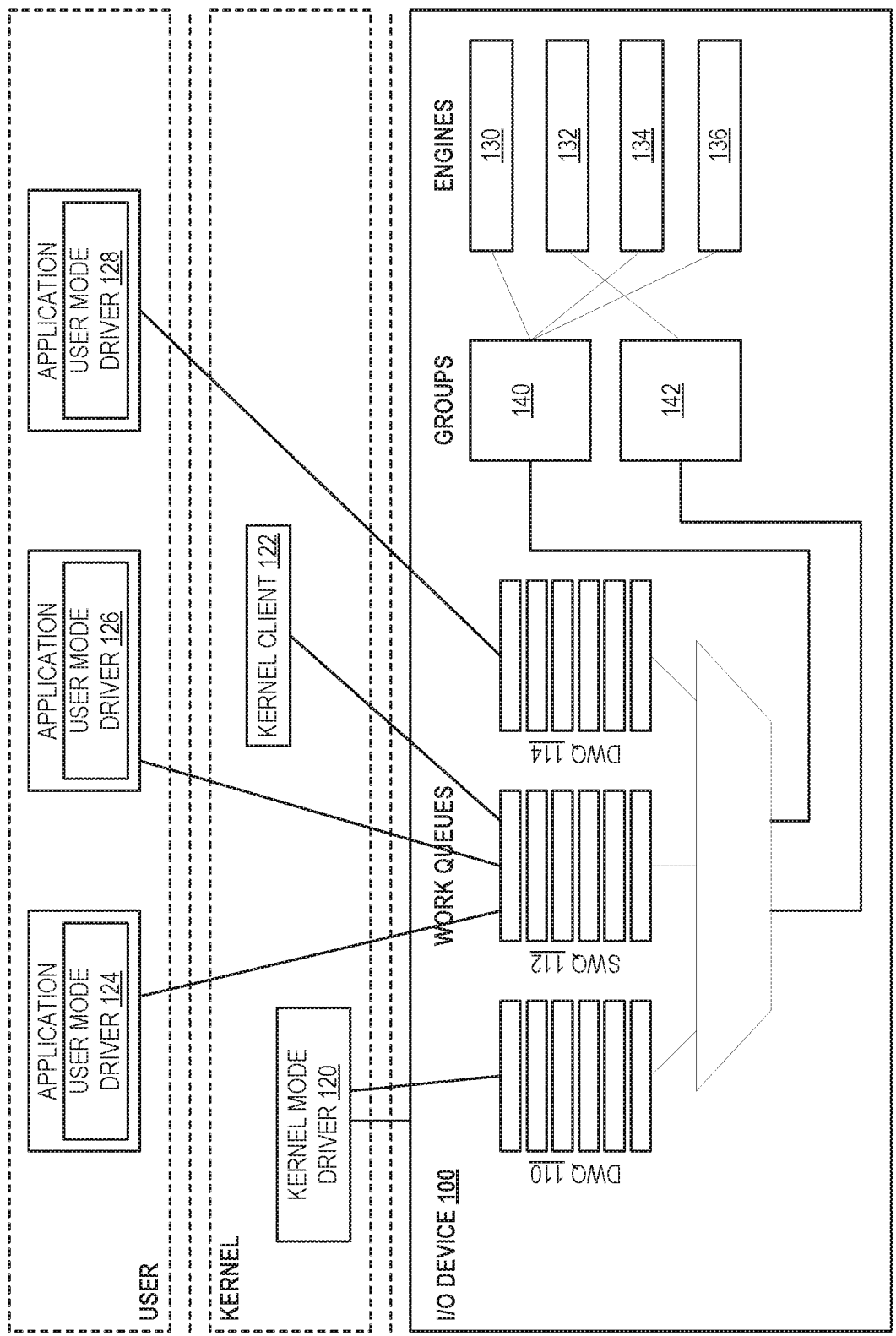
FIG. 1 is a diagram illustrating a scalable device according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, as used in descriptions of embodiments of the invention, a "/" character between terms may mean that an embodiment may include or be implemented using, with, and/or according to the first term and/or the second term (and/or any other additional terms).

As discussed in the background section, a device may service or otherwise support multiple clients. However, the scalability of a device may be limited by its capability to maintain information about each of the different clients that it is servicing, which in turn may be limited by the silicon die area or other space available to store such information. For example, a single-root input/output virtualization (SR-IOV) device, as defined by the Peripheral Component Interconnect Express (PCIe) specification, can implement a larger number of virtual functions (VFs) to support a larger number of clients. Alternatively, a device can implement a larger number of queues and associated client-specific state to support a larger number of clients. However, existing approaches to increasing scalability may increase the cost and/or complexity of a device beyond an acceptable level.

Therefore, the use of embodiments of the invention, which may increase the scalability of a device without a proportional increase in the cost or complexity of the device, may be desired. The use of embodiments of the invention may also increase overall performance of and/or quality of service (QoS) by a device by enabling the device to more efficiently process work from many clients.

FIG. 1 is a block diagram illustrating a scalable device according to an embodiment of the invention. Device 100 in FIG. 1 may be implemented in logic gates, storage elements, and/or any other type of circuitry, all or parts of which may be included in a discrete component and/or integrated into the circuitry of a processing device or any other apparatus in a computer or other information processing system. For example, device 100 in FIG. 1 may correspond to any of coprocessor 645 in FIG. 6, coprocessor 738 in FIG. 7, coprocessor 920 in FIG. 920, each as described below.

A scalable device according to an embodiment of the invention may use any number of work queues, where a work queue is a data structure to be used to accept work from clients. A work queue may be a dedicated work queue (DWQ) that may accept work from a single client or a shared work queue (SWQ) that may accept work from multiple clients. For example, device 100 is shown as including DWQs 110 and 114 and SWQ 112, which may accept work from clients 120, 122, 124, 126, and 128.

A work queue may be implemented using memory within the device (e.g., device 100) and/or using memory not within the device (e.g., host memory, system memory, registers or other storage locations not within the device). Using host memory, for example, a work queue may be implemented with a base register, a head register, and a tail register that are writable by software to inform the device about work submission. Using device memory, for example, a work queue may be implemented with an address to which software may write to submit work.

Work queues may be used to store work descriptors that include a client identifier (ID) and privileges. The client ID is to identify the client (e.g., with a process address space identifier (PASID)) and the privileges indicate the privileges that the device may use to identify the address domain and privileges of the client. Work descriptors may be populated by trusted hardware (e.g., a CPU in a secured environment) or trusted software (an operating system (OS) running on a CPU in a secured environment) to ensure that they cannot be spoofed by unprivileged clients.

In various embodiments of the invention, work descriptors are fully self-describing so that the device does not need to retain any client-specific state, and thus does not require additional memory to support additional clients. A fully self-describing work descriptor contains all the information needed to perform the work requested.

For example, a work descriptor in an embodiment may include a pointer to a completion record in host memory where completion status (including any error status) is to be written. A completion record may also contain any partial results that a subsequent work descriptor may use, so that data may be carried forward through operations (e.g., a cyclic redundancy check computation may use the result from each step as an input to the next step). A completion record may also contain flag bits and/or any other information that may be used in performing operations. Therefore, no memory within the device will be used to store per-client state regarding completion status, partial results, flag bits, etc.

In various embodiments of the invention, work descriptors may also be used to avoid other limits on the scalability of the device. For example, limiting the number of clients to one per messaged-signaled interrupt in a PCI MSI-X table in the device may be avoided according to either of the following approaches. According to either approach, any client may be set up with multiple interrupts so that the client can choose to specify different interrupts for different descriptors, thus allowing the client to perform interrupt rebalancing without involving OS or other system software.

In an embodiment, a work descriptor may be designed to include interrupt message information (e.g., MSI address and data) passed in by the client. Since the interrupt message is provided by the client, it is untrusted, so interrupt remapping hardware (e.g., an I/O memory management unit) may be responsible for ensuring that a client cannot request an interrupt that is not assigned to it. For example, a PASID along with a remappable interrupt message may be used to locate an Interrupt Remapping Table Entry for the interrupt message (PASID granular interrupt remapping). PASID granular interrupt remapping allows the same message to have different meanings when used in conjunction with different PASIDs, and it also allows system software to control which interrupt messages may be used by each client (as identified by the client's PASID). Then, the device can use the interrupt message information from the work descriptor to generate the interrupt when it is done with the operation, while avoiding storing interrupt messages in the device.

In an embodiment, a work descriptor may be designed to include an interrupt handle (instead of the full MSI address and data values). The interrupt handle in the descriptor designates an entry in an interrupt message table. The device may implement the interrupt message table in host memory, with each interrupt table entry containing the MSI address and data. Since the interrupt message table is in host memory rather than device memory, it can be made large enough to support any number of clients. The interrupt handle in the work descriptor may be used by the device to index into the interrupt table to identify the MSI address and data values for generating the interrupt when the device is done with the operation. The device will first validate the interrupt handle using the PASID to ensure the client is allowed to use the specific interrupt handle. The device may validate the interrupt handle by using PASID granular interrupt message tables or by including the PASID in the interrupt table entry during interrupt setup and generation, matching the entry's PASID against client's PASID. To avoid reading interrupt table entries from host memory on every descriptor, an interrupt message cache within the device may cache frequently used interrupt entries.

In addition to reducing or eliminating per-client state on the device, embodiments of the invention provide for efficiently processing work from many clients. Embodiments may allow prioritization of work from time-sensitive clients while ensuring forward-progress on work from other clients. Embodiments may prevent errors or performance issues due to some clients from negatively affecting other clients.

A work submission portal is a means by which clients may submit work requests to a device. In an embodiment, an SWQ may have more than one work submission portal to which clients may submit work, rather than a single work submission portal mapped to all clients using the SWQ. The use of a single work submission portal per SWQ may cause clients to keep retrying work submissions because they experience the SWQ as full, which may make the use of the device difficult and unpredictable for other clients. In contrast, the use of multiple work submission queues per SWQ according to embodiments of the invention may provide for prioritization of work requests and prevention of starvation of some clients. In embodiments, work submission portals may be implemented as memory mapped I/O (MMIO) addresses to which clients may write to submit work requests, so multiple work submission portals may be provided by assigning more than one MMIO address to an SWQ and providing different MMIO addresses to different clients, which does not require additional logic circuitry or storage in the device.

In various embodiments, different work submission portals for an SWQ may have different characteristics, such as different work acceptance priorities for different clients. For example, an SWQ may have a first submission portal designated as a limited portal and a second submission portal designated as an unlimited portal. The SWQ may have a configurable threshold that may be used to reserve some entries exclusively for work submitted through the unlimited portal. For example, the SWQ may be configured to use only up to 80% (threshold) of the SWQ space for work submitted through the limited portal, while work submitted through the unlimited portal may use 100% of the SWQ space. Then, privileged software (e.g., the device driver) can map the limited portal to user space clients and keep the unlimited portal for itself. If user space clients experience an SWQ full condition (e.g., the SWQ returns 'Retry' to user space clients when the SWQ is 80% full), instead of continuously retrying work submission themselves, they can make a request to the device driver to submit the work descriptor on their behalf. The device driver can serialize requests from user space clients and use the unlimited portal to submit work requests. Since 20% of the SWQ space is reserved for the unlimited portal, the device driver's work submission will likely succeed.

Embodiments may also provide for handling situations in which the SWQ is 100% full (e.g., even the unlimited portal returns 'Retry'). In an embodiment, the device driver may respond to the client with 'Retry' as if 'Retry' had been received directly from the device. In an embodiment, the device driver may block the client until the work can be submitted, and the device driver may possibly schedule another client in the meantime. In an embodiment, the device driver may place the work descriptor in a software-defined work queue until it can be submitted to the device, but resume the client as if the work had been successfully submitted to the device. According to this latter approach, the client may continue operation while waiting for the device to catch up. Embodiments may provide for the use of this latter approach, by ensuring that all descriptors to the device are independent of each other with respect to ordering or by preventing the client from submitting any descriptors directly to the device that could be processed prior to the descriptor that was queued in software by the device driver. This prevention may be achieved by removing the device submission portal from the client's memory map so the client cannot submit work to the device directly or by locking the SWQ so that no clients can submit work. In this locking approach, all clients work submissions would return 'Retry' and clients would have to request the device driver to submit their work, which would provide fairness, but may also have high overhead because of the bottleneck of work submissions going through the device driver (which might be acceptable because it would only happen when the shared work queue is completely full).

Embodiments may also provide for configurability of the work queues themselves. For example, any or each of the multiple work queues may be configured, at run-time based on client requirements, as dedicated or shared. Work queues may be assigned different priorities and configured by software. The device may dispatch commands from higher priority work queues preferentially over commands from lower priority work queues without starving the lower priority work queues. Some clients may have access to multiple work queues, and thus have the ability to prioritize their own work, while other clients may have access to only a single work queue, thus fixing the priority of all work they submit.

Embodiments may also provide for alleviating a problem which occurs when a device is blocked because it is waiting for a response from another part of the system (e.g., completion of a memory read, translation of address, handling of page fault) while performing an operation. This problem is called head-of-line blocking, because the operation being performed in the device prevents other operations in line behind it from making progress.

In various embodiments, to alleviate head-of-line blocking, a device may include multiple operation components (engines) that can process individual work descriptors in parallel, such as engines 130, 132, 134, and 136. In an embodiment, one or more work queues may be grouped together with one or more engines. A device may support several groups, such as groups 140 and 142. Each work queue and each engine may be configured by software to be part of any one group. Work descriptors from one or more work queues in a group may be dispatched to any of the engines in that group. Thus, if one engine in a group is waiting for an external response while processing a descriptor from a work queue, other engines in the group may continue to process other work descriptors from the same or other work queues.

In an alternative embodiment, a device may implement an out-of-order processing engine, which may suspend a work descriptor that is waiting for an external response, and process other work descriptors in the meantime from the same or other work queues.

Furthermore, in various embodiments, a device may have internal resources (e.g., device internal memory) that engines use to process work descriptors from various clients. If these resources are limited, the device may prioritize (or provide QoS for) use of these resources by different clients to ensure that work descriptors (e.g., relatively large or time-consuming ones) from one or a few clients do not consume most or all internal resources, thereby affecting the processing of other clients and overall performance of the device. The prioritization may be done using a credit-based system in which credits represent the internal resources. Credits may be assigned to groups, individual work queues, or individual engines to control the number of resources each group, work queue, or engine is allowed to use to process its work descriptors. In an embodiment, a device may define two credit thresholds for each group, work queue, or engine: a first threshold to specify a minimum number of credits reserved for a group, work queue, or engine (minimum guaranteed or reserved credits), and a second threshold to specify a maximum number of credits allowed for a group, work queue, or engine (maximum allowed credits).

Embodiments may also provide for efficient handling of page faults. If a device supports virtual memory (e.g., shared virtual memory (SVM) or I/O virtual addresses (IOVA)), the addresses given to the device in work descriptors are not guaranteed to be mapped in physical memory. Before accessing host memory (e.g., through direct memory access (DMA)), the device may request address translation from an I/O memory management unit (IOMMU), using, for example, the Address Translation Services described in the PCIe specification. The IOMMU walks the address translation tables and, if a translation is present, returns the translated physical address to the device so that the device can access the data in memory. However, if the virtual address is not currently present in main memory, the result will be a translation error (an I/O page fault). A page fault may also occur when a page is present, but the processor or device does not have rights to perform the type of access requested (e.g., a device attempts to write to a read-only page).

Figure 2:
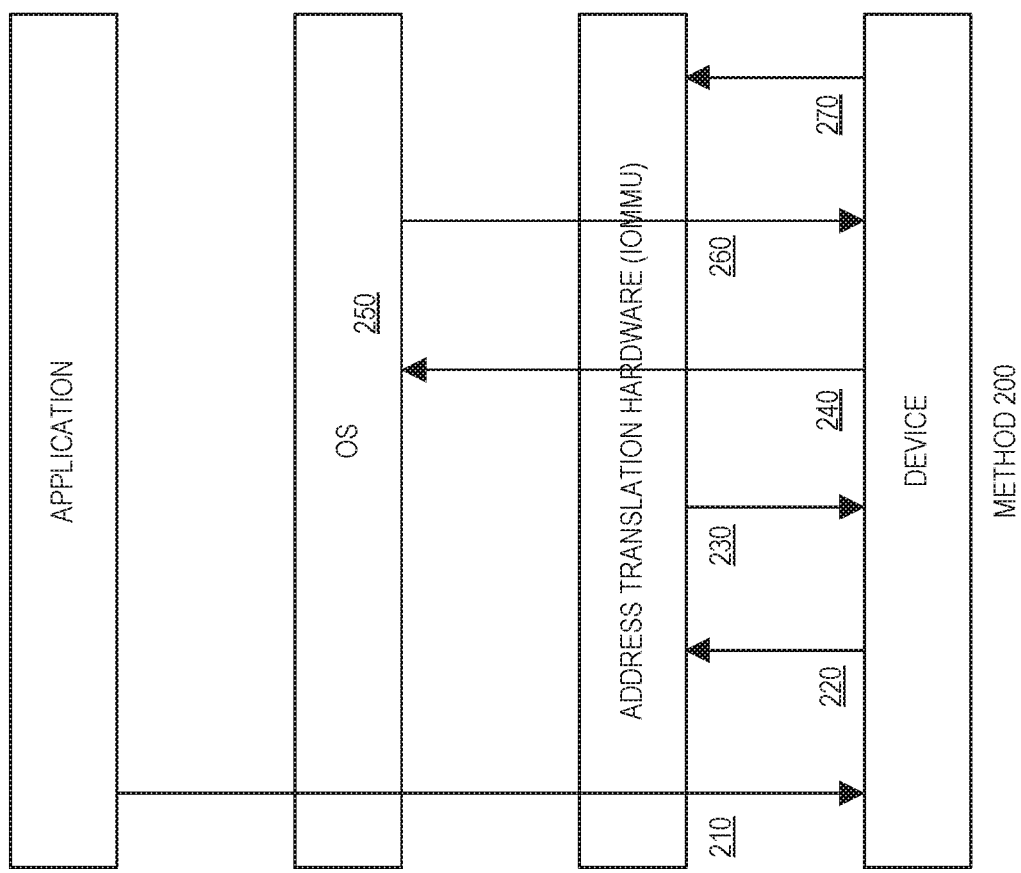
FIG. 2 is a diagram illustrating a method for handling a page fault.

When a device encounters a page fault, it cannot handle the page fault itself because the memory management system software does not run on the device. Therefore, according to a method (200) illustrated in FIG. 2, after the application submits a command to the device (210), the device attempts to access the page (220), and the IOMMU responds with a page fault (230), the device sends a page fault notification through the IOMMU to the OS (240) and blocks the descriptor processing until the page fault is resolved. After resolving the page fault (250), the OS responds back to the device, through the IOMMU, that the page is available (260). Then, the device attempts to re-access the page, and this time the access is successful (270).

A device typically implements a limited number of simultaneous outstanding I/O page fault notifications to the OS. Hence, when supporting a large number of clients, the device may encounter many page faults and may usually be waiting for at least one page fault to be resolved, which will significantly reduce the performance of the device.

Figure 3:
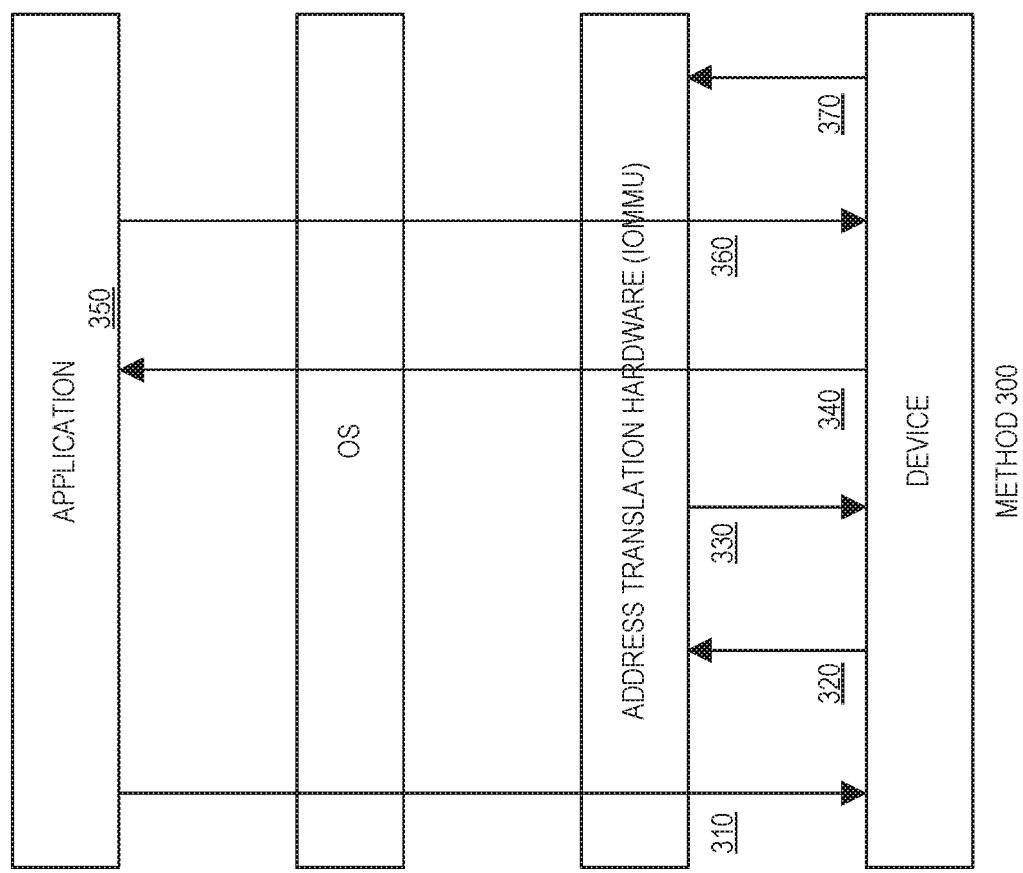
FIG. 3 is a diagram illustrating a method for handling a page fault according to an embodiment of the invention.

Therefore, instead of blocking on an I/O page fault, embodiments of the invention, such as method 300 in FIG. 3, may include (after the application submits a command to the device (310), the device attempts to access the page (320), and the IOMMU responds with a page fault (330)), the device directly notifying the client about a page fault (340) and terminate processing of the work descriptor that caused the page fault. Then, the device may continue processing other work descriptors without blocking while the application may resolve or otherwise respond to (as described below) the page fault (350). After the page fault is resolved, the application may resubmit the command to the device (360) and the device may attempt to re-access the page (370).

According to embodiments such as method 300, page fault handing may be left to the client. For example, the client application may request the OS to resolve the page fault (e.g., by accessing the faulting pages) and resubmit a work descriptor to resume the work after the page fault is resolved. Alternatively, the client may decide to complete the remaining work using some other method instead of using the device, such as by using the CPU to perform the operation.

The mechanism used by the device to notify the application that it has encountered a page fault is called partial completion. In embodiments including partial completion, the device may report completion of the operation to the client in the normal way (e.g., by setting a device register, modifying the tail pointer of a queue or ring buffer, writing to a shared memory location, generating an interrupt, or any combination of these), but the completion record information may include the following additional elements: a status field indicating that a page fault was encountered, an indication of how much of the operation completed prior to the page fault, the virtual address that could not be translated, an indication of whether the device intended to read or write to the address that could not be translated, and any other information needed by software to resume the operation (see examples below).

As implied by the name, partial completion means that the device may have performed part of the requested operation prior to encountering the page fault. By reporting partial completion to the client, the client (e.g., application software) may begin using the results that have been completed, even while the page fault is being resolved and the remainder of the operation is being performed by the device.

In embodiments, a partial completion may report that none of the operation has been completed, if, for example, the device encounters a page fault on the first page that is needed to begin the operation.

In embodiments, depending on the type, length, and complexity of the operation, the device may restart the operation from the beginning rather than resume from the point where it encountered the page fault. In this case, the device may report that none of the operation has completed, even when the page fault was not on the first page (assuming that the partially completed operation has not overwritten any of its inputs).

In embodiments, the partial completion information includes all information required to resume the operation. The client may resume the operation by submitting a new command that starts where the previous operation stopped. For operations that carry forward data throughout the operation (e.g., CRC computation), if a page fault is encountered part-way through the operation, the intermediate result is retained for use when the operation is resumed. The intermediate result may be saved in the completion record along with the page fault information. When the application resumes the operation after satisfying the page fault, it passes the intermediate result along with the command to resume the operation.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 4:
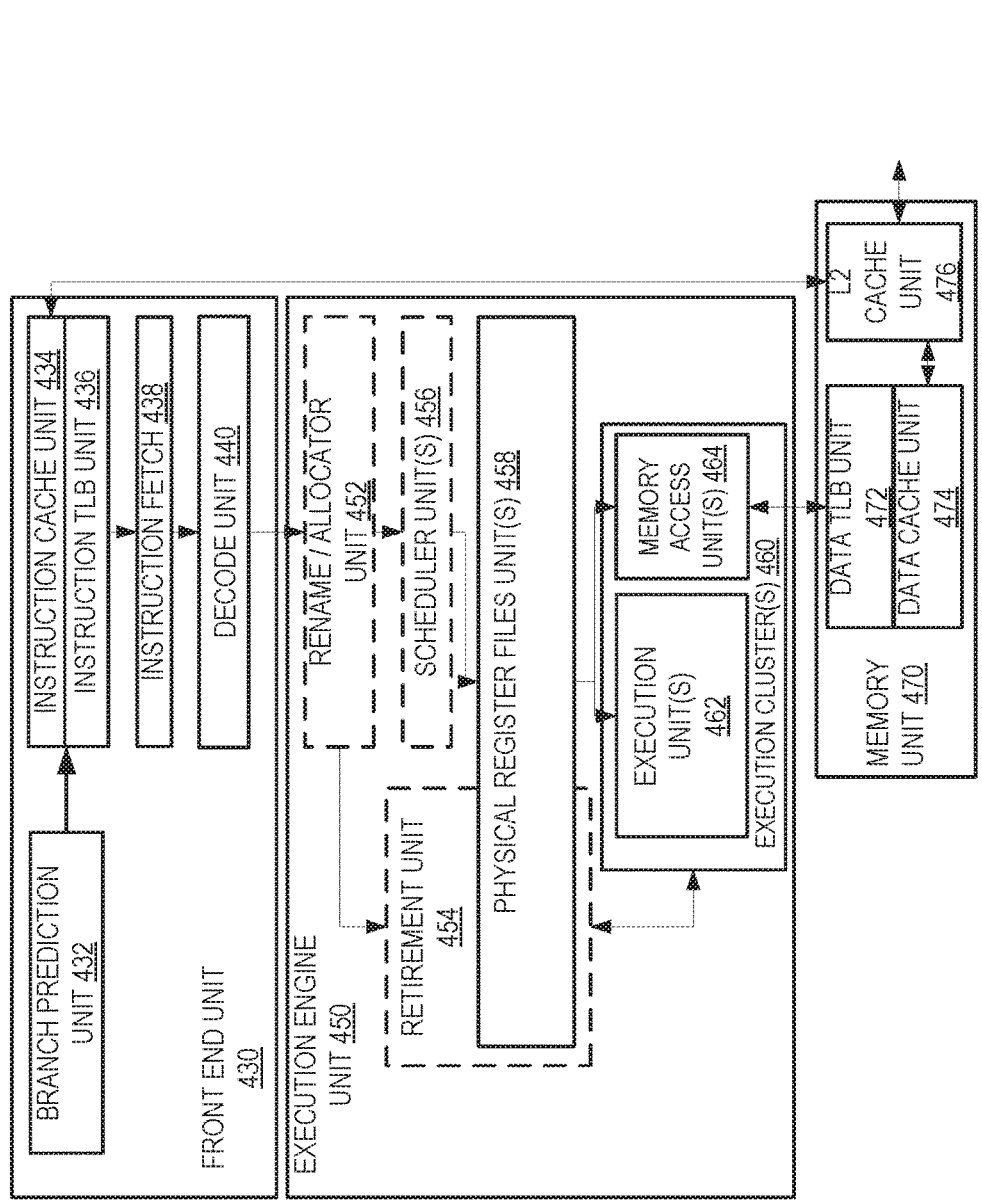
FIG. 4A is a diagram illustrating both an exemplary in-order pipeline and an exemplary register renaming, out-of-order issue/execution pipeline according to embodiments of the invention.
FIG. 4B is a diagram illustrating both an exemplary embodiment of an in-order architecture core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
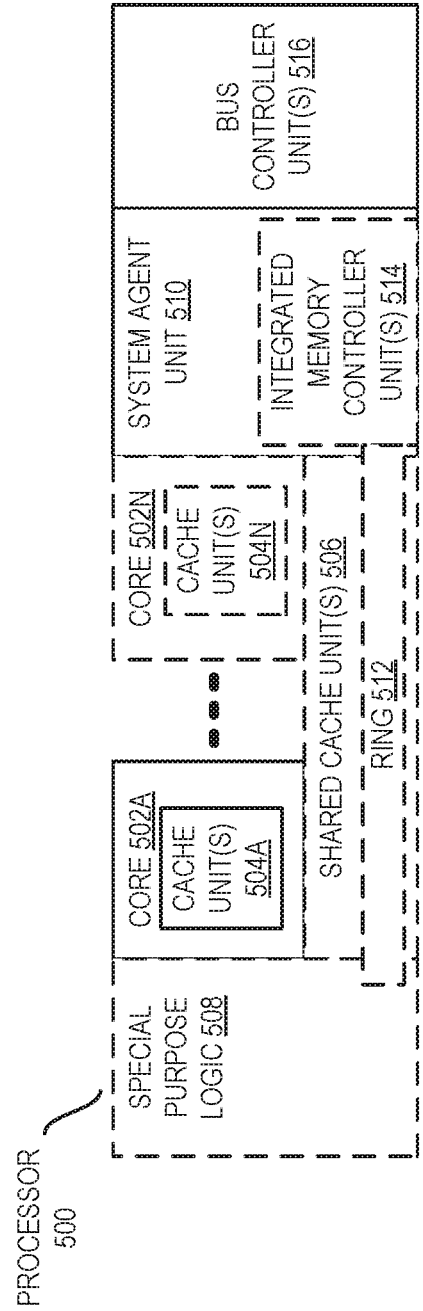
FIG. 5 is a diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
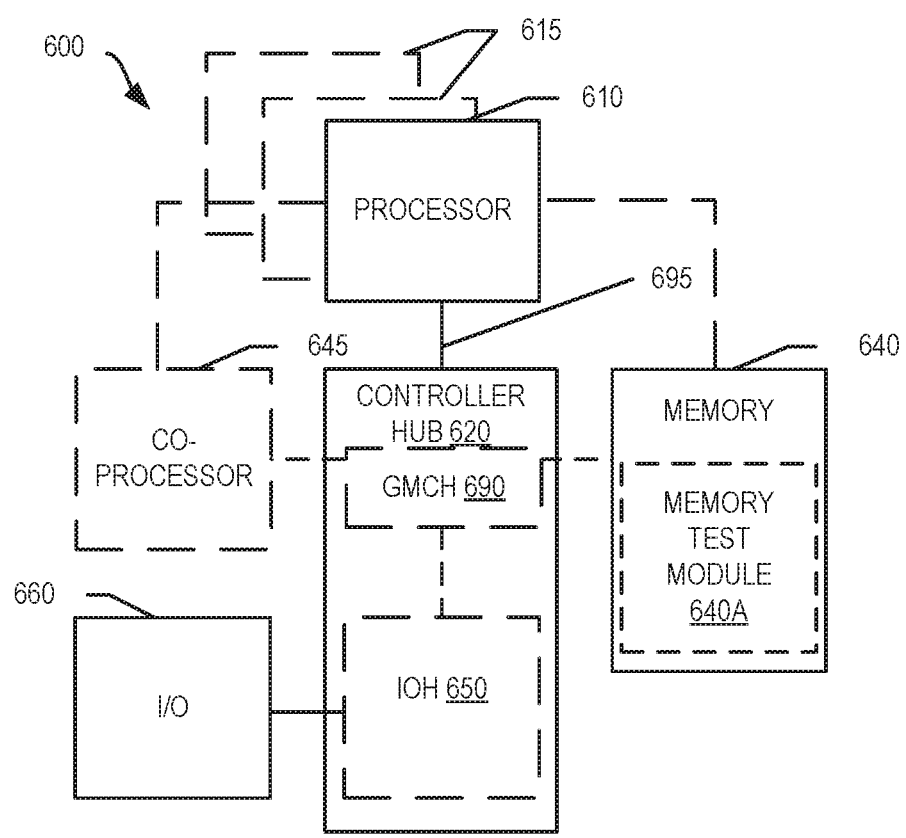
FIG. 6 is a diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
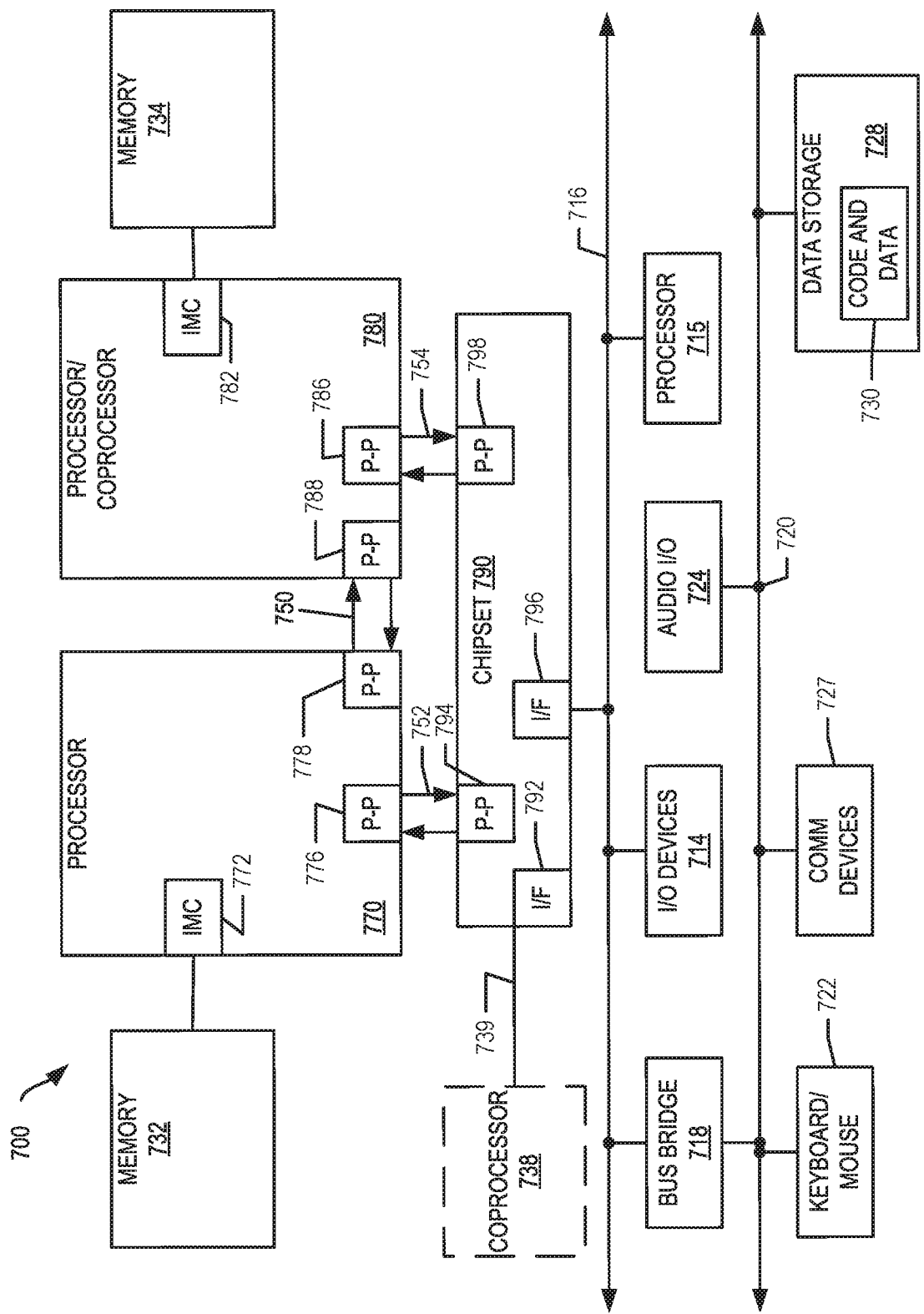
FIG. 7 is a diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
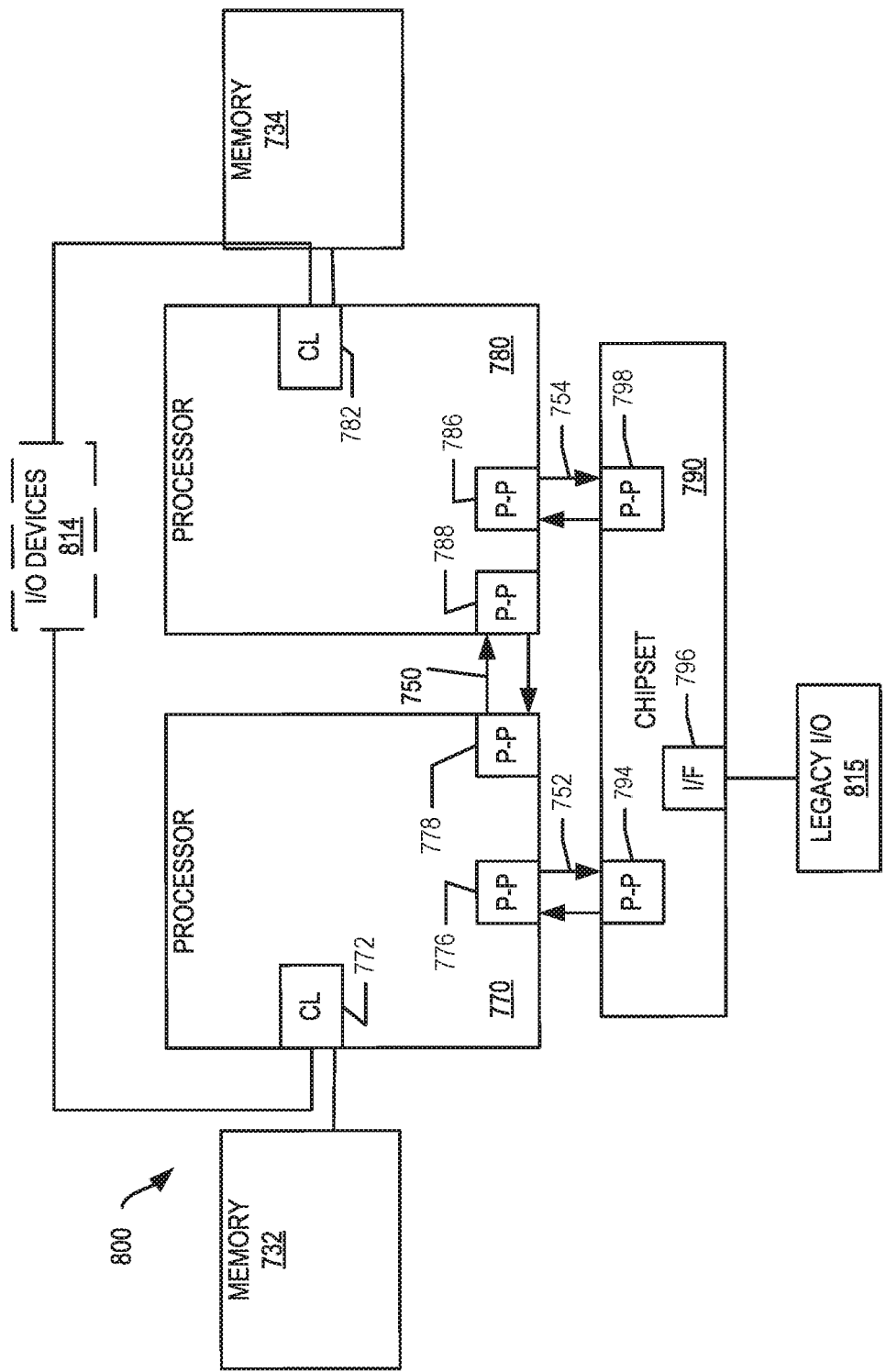
FIG. 8 is a diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
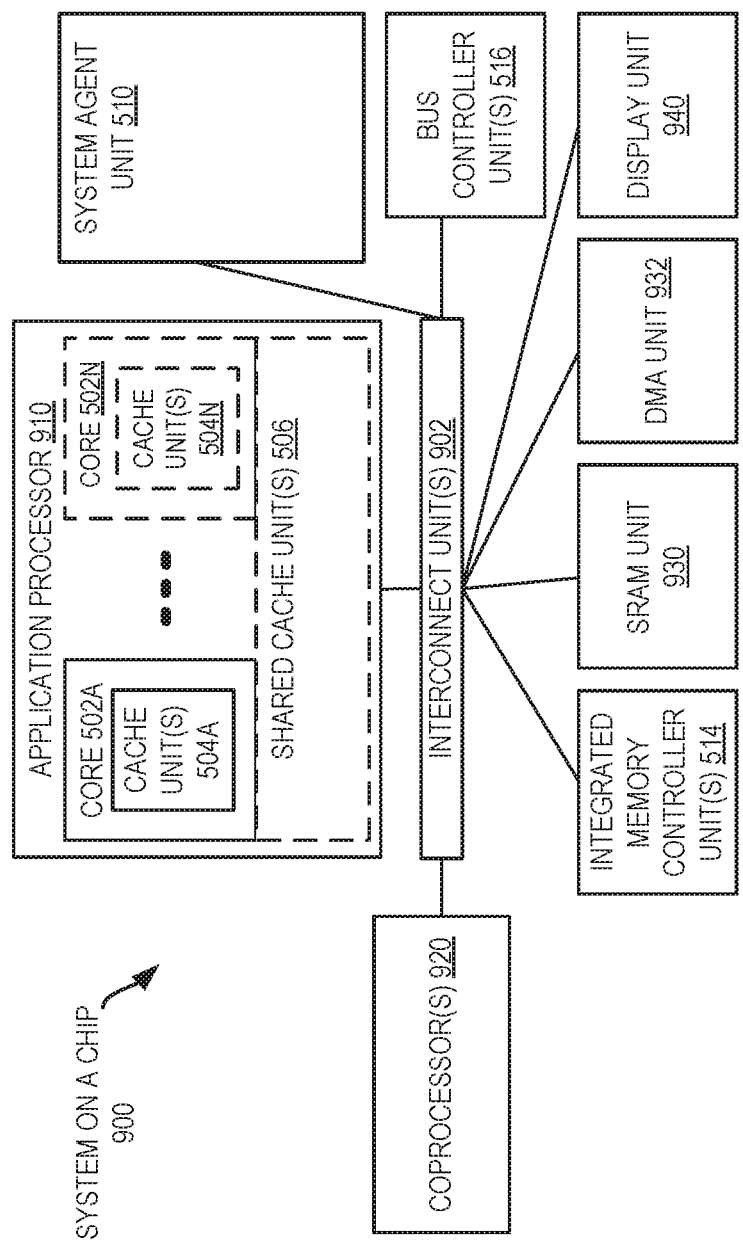
FIG. 9 is a diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, an apparatus includes an interface to receive a plurality of work requests from a plurality of clients and a plurality of engines to perform the plurality of work requests. The work requests are to be dispatched to the plurality of engines from a plurality of work queues. The work queues are to store a work descriptor per work request. Each work descriptor is to include all information needed to perform a corresponding work request.

The work descriptor may include an identifier of the client. The work descriptor may include one or more privileges for the apparatus to use to identify an address domain of the client. The work descriptor may include results of a previous work request. The work descriptor may include flags. The work descriptor may include interrupt message information. The work descriptor is to include a pointer to a completion record. The completion record is to include at least one of error status, an address at which a page fault occurred, and a measure of work completed before an error or page fault occurred. The completion record may include results of the work request. At least one of the plurality of work queues may be shared by at least two of the plurality of clients. The at least one of the plurality of work queues may have at least a first work submission portal and a second work submission portal. The first work submission portal may receive work requests having a lower priority than work requests received by the second submission portal. The first work submission portal may be configured to accept work requests only up to a threshold amount of the capacity of the corresponding work queue. The threshold may be configurable. One or more of the plurality of work queues may be grouped with one or more of the plurality of engines to form a plurality of work groups, wherein work requests may be dispatched from each work queue to one or more engines in a corresponding work group. The work groups may be configurable. Availability of resources for processing work requests may be controlled by assigning credits representing the resources to each work group.

In an embodiment, a method may include receiving, by a device, one of a plurality of work requests from one of a plurality of clients; and dispatching, from one of a plurality of work queues, the one of the plurality of work requests to one of a plurality of engines; wherein the work queues are to store a work descriptor per work request, each work descriptor to include all information needed to perform a corresponding work request. The method may also include notifying, by the device in response to a page fault associated with the one of the plurality of work requests, the one of the plurality of clients In an embodiment, an apparatus may include means for performing any of the methods described above. In an embodiment, a machine-readable tangible medium may store instructions, which, when executed by a machine, cause the machine to perform any of the methods described above.

In an embodiment, a system may include a processor to execute a client; and a co-processor to perform a work request from the client; wherein the client is to submit the work request to the co-processor through a work queue, the work queues to store a work descriptor corresponding to the work request, the work descriptor to include all information needed to perform the corresponding work request.

The co-processor may perform a plurality of work requests from a plurality of clients, wherein the co-processor is capable of performing additional work requests for additional clients without storing additional client state within the co-processor.

In system embodiments, as in apparatus and other embodiments, the work descriptor may include an identifier of the client. The work descriptor may include one or more privileges for the apparatus to use to identify an address domain of the client. The work descriptor may include results of a previous work request. The work descriptor may include flags. The work descriptor may include interrupt message information. The work descriptor is to include a pointer to a completion record. The completion record is to include at least one of error status, an address at which a page fault occurred, and a measure of work completed before an error or page fault occurred. The completion record may include results of the work request. At least one of the plurality of work queues may be shared by at least two of the plurality of clients. The at least one of the plurality of work queues may have at least a first work submission portal and a second work submission portal. The first work submission portal may receive work requests having a lower priority than work requests received by the second submission portal. The first work submission portal may be configured to accept work requests only up to a threshold amount of the capacity of the corresponding work queue. The threshold may be configurable. One or more of the plurality of work queues may be grouped with one or more of the plurality of engines to form a plurality of work groups, wherein work requests may be dispatched from each work queue to one or more engines in a corresponding work group. The work groups may be configurable. Availability of resources for processing work requests may be controlled by assigning credits representing the resources to each work group.

What is claimed is:

1. An apparatus comprising:
    an interface to receive a plurality of work requests from a plurality of clients; and a plurality of engines to perform the plurality of work requests;
    wherein the work requests are to be dispatched to the plurality of engines from a plurality of work queues, the work queues to store a work descriptor per work request, each work descriptor to include an identifier of the corresponding client, a privilege of the corresponding client, an interrupt handle designating an entry in an interrupt message table, and all other information needed to perform a corresponding work request, wherein the apparatus validates the interrupt handle using a process address space identifier to ensure the corresponding client is allowed to use the interrupt handle.

2. The apparatus of claim 1, wherein the work descriptor is to include results of a previous work request.

3. The apparatus of claim 1, wherein the work descriptor is to include interrupt message information.

4. The apparatus of claim 1, wherein the work descriptor is to include a pointer to a completion record.

5. The apparatus of claim 4, wherein the completion record is to include at least one of error status, an address at which a page fault occurred, and a measure of work completed before an error or page fault occurred.

6. The apparatus of claim 4, wherein the completion record is to include results of the work request.

7. The apparatus of claim 1, wherein at least one of the plurality of work queues is to be shared by at least two of the plurality of clients.

8. The apparatus of claim 7, wherein the at least one of the plurality of work queues is to have at least a first work submission portal and a second work submission portal.

9. The apparatus of claim 8, wherein the first work submission portal is to receive work requests having a lower priority than work requests to be received by the second submission portal.

10. The apparatus of claim 9, wherein the first work submission portal is configured to accept work requests only up to a threshold amount of the capacity of the corresponding work queue.

11. The apparatus of claim 10, wherein the threshold is configurable.

12. The apparatus of claim 1, wherein one or more of the plurality of work queues are to be grouped with one or more of the plurality of engines to form a plurality of work groups, wherein work requests are to be dispatched from each work queue to one or more engines in a corresponding work group.

13. The apparatus of claim 12, wherein the work groups are configurable.

14. The apparatus of claim 13, wherein availability of resources for processing work requests is to be controlled by assigning credits representing the resources to each work group.

15. A method comprising:
receiving, by a device, one of a plurality of work requests from one of a plurality of clients; and
dispatching, from one of a plurality of work queues, the one of the plurality of work requests to one of a plurality of engines;
wherein the work queues are to store a work descriptor per work request, each work descriptor to include an identifier of the corresponding client, a privilege of the corresponding client, an interrupt handle designating an entry in an interrupt message table, and all other information needed to perform a corresponding work request,
wherein the device validates the interrupt handle using a process address space identifier to ensure the corresponding client is allowed to use the interrupt handle.

16. The method of claim 15, further comprising notifying, by the device in response to a page fault associated with the one of the plurality of work requests, the one of the plurality of clients.

17. A system comprising:
a processor to execute a client;
a co-processor to perform a work request from the client; and
wherein the client is to submit the work request to the co-processor through a work queue, the work queues to store a work descriptor corresponding to the work request, the work descriptor to include an identifier of the corresponding client, a privilege of the corresponding client, an interrupt handle designating an entry in an interrupt message table, and all other information needed to perform a corresponding work request,
wherein the co-processor validates the interrupt handle using a process address space identifier to ensure the corresponding client is allowed to use the interrupt handle.

18. The system of claim 17, wherein the co-processor is to perform a plurality of work requests from a plurality of clients, wherein the co-processor is capable of performing additional work requests for additional clients without storing additional client state within the co-processor.

* * * * *